US009824073B1

(12) United States Patent
Schulman et al.

(10) Patent No.: US 9,824,073 B1
(45) Date of Patent: Nov. 21, 2017

(54) ESTIMATING EFFECTS OF USER INTERFACE CHANGES ON CONTENT ITEM PERFORMANCE

(75) Inventors: Christina Schulman, Pittsburgh, PA (US); John Taylor, Pittsburgh, PA (US)

(73) Assignee: Google LLC, Mountain View, CA (US)

( * ) Notice: Subject to any disclaimer, the term of this patent is extended or adjusted under 35 U.S.C. 154(b) by 926 days.

(21) Appl. No.: 13/076,864

(22) Filed: Mar. 31, 2011

(51) Int. Cl.
G06F 17/00 (2006.01)
G06F 17/20 (2006.01)
G06F 17/21 (2006.01)
G06F 17/22 (2006.01)
G06F 17/24 (2006.01)
G06F 17/25 (2006.01)
G06F 17/26 (2006.01)
G06F 17/27 (2006.01)
G06F 17/28 (2006.01)

(52) U.S. Cl.
CPC .................... G06F 17/2247 (2013.01)

(58) Field of Classification Search
CPC .......... G06F 17/30905; G06F 17/2247; G06F 17/30716
USPC ........... 715/234, 206, 800; 707/748
See application file for complete search history.

(56) References Cited

U.S. PATENT DOCUMENTS

| 7,543,024 | B2 * | 6/2009 | Holstege | 715/236 |
|---|---|---|---|---|
| 7,715,324 | B1 * | 5/2010 | Harvell et al. | 370/252 |
| 8,065,414 | B2 * | 11/2011 | Anastas et al. | 715/234 |
| 8,078,989 | B2 * | 12/2011 | Parkinson | 715/800 |
| 8,230,320 | B2 * | 7/2012 | Brooks et al. | 715/206 |
| 2003/0086536 | A1 * | 5/2003 | Salzberg | H04M 3/22 379/15.02 |
| 2009/0248513 | A1 * | 10/2009 | Aggarwal | G06Q 30/02 705/14.72 |
| 2009/0327859 | A1 * | 12/2009 | Kadluczka | G06F 17/30864 715/234 |
| 2010/0017704 | A1 * | 1/2010 | Jaffe | G06Q 10/107 715/243 |
| 2010/0228738 | A1 * | 9/2010 | Mehta et al. | 707/748 |
| 2010/0287132 | A1 * | 11/2010 | Hauser | 715/234 |
| 2010/0287134 | A1 * | 11/2010 | Hauser | 715/234 |
| 2011/0093773 | A1 * | 4/2011 | Yee | 715/235 |

* cited by examiner

*Primary Examiner* — Manglesh M Patel
*Assistant Examiner* — Nicholas Hasty
(74) *Attorney, Agent, or Firm* — Foley & Lardner LLP; John D. Lanza (57) ABSTRACT

Methods, systems, and apparatus, including computer programs encoded on a computer storage medium, for content evaluation. In one aspect, a method includes identifying a first document object model for a resource, the first document object model being associated with a performance profile, the performance profile specifying performance factors for content item presentation positions of the resource. A first similarity measure can be computed for first document object model based on the first document object model and a second document object model for the resource, the second document object model for the resource being a previous document object model for the resource. A new performance profile can be computed for the resource if the first similarity measure does not meet a similarity threshold.

18 Claims, 5 Drawing Sheets

ESTIMATING EFFECTS OF USER INTERFACE CHANGES ON CONTENT ITEM PERFORMANCE

BACKGROUND

This specification relates to content presentation.

The Internet provides access to a wide variety of resources, such as video and/or audio files, as well as web pages for particular subjects or particular news articles. Access to these resources has provided opportunities for other content (e.g., advertisements or ads) to be provided with the resources. For example, web pages can include advertisement slots in which advertisements can be presented. The advertisements slots can be defined in the web page or defined for presentation with a web page, for example, in a pop-up window.

Performance measures can be used as a quality measure of presented content items. An example of a performance measure is the click-through-rate (CTR). In some implementations, the CTR is a value representing the number of times a content item was selected by a user as compared to the number of times the content item was presented. Content items with a high CTR are generally considered higher quality than content items with a low CTR.

The performance of a content item can be influenced by many factors including, for example, the resource it is presented with and the position the content item occupies on the resource. For example, an advertisement presented in the top advertisement slot of a webpage may achieve a CTR different than the same advertisement presented in the bottom advertisement slot of the same webpage. In this example, the advertisement hasn't changed but the position of the advertisement on the webpage has. As another example, an advertisement presented in an advertisement slot of a webpage may achieve a CTR different than the same advertisement presented in the same advertisement slot after the webpage has been changed (i.e. restructured).

The performance effects attributable to a resource upon which a content item is presented can be referred to as the performance factors. Collectively, the performance factors can be referred to as a performance profile. Not considering the performance profile of a resource when comparing the relative performance of content items can render the comparison less useful. For example, a first advertisement presented in the top advertisement slot of a webpage may achieve a first CTR and a second advertisement presented in the different advertisement slot of a webpage may achieve a second CTR. Comparing the first CTR to the second CTR can be less useful as a quality comparison because the first and second CTR values can include the positional effects of the webpage.

SUMMARY

This specification describes technologies relating to content presentation.

In general, one innovative aspect of the subject matter described in this specification can be embodied in methods that include the actions of identifying a first document object model for a resource. The first document object model is associated with a performance profile. The performance profile specifies performance factors for content item presentation positions of the resource. A similarity measure for the first document object model is computed based on the first document object model and a second document object model for the resource. The second document object model for the resource is a previous document object model for the resource. A new performance profile for the resource is determined if the similarity measure does not meet a similarity threshold. Other embodiments of this aspect include corresponding systems, apparatus, and computer programs, configured to perform the actions of the methods, encoded on computer storage devices.

These and other embodiments can each optionally include none, one or more of the following features. The identifying of a first document object model can include providing a search query to a search apparatus, receiving a search results page from the search apparatus, and determining a first document object model for the resource based on the search results page. The identifying of a first document object model can include identifying a document object model that is associated with performance factors that respectively specify a normalized click-through-rate for each respective content item presentation position that has been defined for the resource. The computing a similarity measure for the first document object model can include determining a first value based on a structure of the first document object model, determining a second value based on a structure of the second document object model, and computing the similarity measure based on a difference between the first value and the second value. The determining a new performance profile can include computing a new performance profile for the resource based on performance of content items that have been presented with the resource.

Particular embodiments of the subject matter described in this specification can be implemented so as to realize none, one or more of the following advantages. The subject matter described herein can be used to provide enhanced comparative measures of content performance. Positional locations on a resource can be determined for optimal content performance.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

A document object model is identified for a resource. A document object model is a cross-platform and language-independent convention for representing and interacting with objects in the resource. The document object model is associated with a performance profile for the resource. The performance profile specifies performance factors for the content item presentation positions of the resource. A similarity measure for the document object model is computed based on the document object model and a previous document object model for the resource. In response to the similarity measure not meeting a similarity threshold, a new performance profile is determined for the resource.

Figure 1:
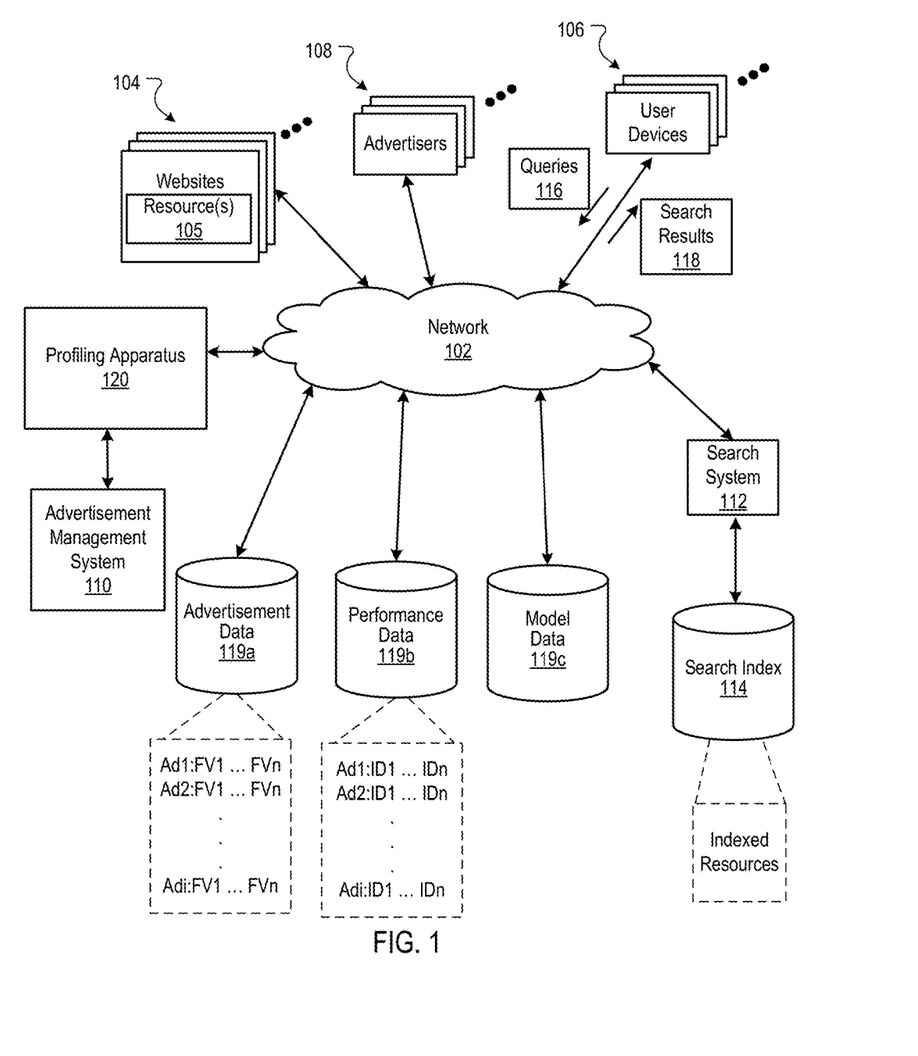
FIG. 1 is a block diagram of an example environment in which a content management system 110 manages content delivery services.

FIG. 1 is a block diagram of an example environment 100 in which a content management system (e.g., advertisement management system 110) manages content (e.g., advertising) services. The example environment 100 includes a network 102, such as a local area network (LAN), a wide area network (WAN), the Internet, or a combination thereof. The network 102 connects websites 104, user devices 106, content sponsors (e.g., advertisers 108), and the advertisement management system 110. The example environment 100 may include many thousands of websites 104, user devices 106, and advertisers 108.

A website 104 is one or more resources 105 associated with a domain name and hosted by one or more servers. An example website is a collection of web pages formatted in the hypertext markup language (HTML) that can contain text, images, multimedia content, and programming elements, such as scripts. Each website 104 is maintained by a publisher/sponsor, which is an entity that controls, manages and/or owns the website 104.

A resource 105 is any data that can be provided over the network 102. A resource 105 is identified by a resource address that is associated with the resource 105. Resources include HTML pages, word processing documents, and portable document format (PDF) documents, images, video, and feed sources, to name only a few. The resources can include content, such as words, phrases, images and sounds, that may include embedded information (such as meta-information in hyperlinks) and/or embedded instructions (such as JavaScript scripts). Units of content that are presented in (or with) resources are referred to as content items.

A user device 106 is an electronic device that is under control of a user and is capable of requesting and receiving resources over the network 102. Example user devices 106 include personal computers, mobile communication devices, and other devices that can send and receive data over the network 102. A user device 106 typically includes a user application, such as a web browser, to facilitate the sending and receiving of data over the network 102.

A user device 106 can request resources 105 from a website 104. In turn, data representing the resource 105 can be provided to the user device 106 for presentation by the user device 106. The data representing the resource 105 can also include data specifying a portion of the resource or a portion of a user display (e.g., a presentation location of a pop-up window or in a slot of a web page) in which advertisements can be presented. These specified portions of the resource or user display are referred to as slots or advertisement slots.

To facilitate searching of these resources 105, the environment 100 can include a search system 112 that identifies the resources 105 by crawling and indexing the resources 105 provided by the publishers on the websites 104. Data about the resources can be indexed based on the resource 105 to which the data corresponds. The indexed and, optionally, cached copies of the resources 105 are stored in a search index 114.

User devices 106 can submit search queries 116 to the search system 112 over the network 102. In response, the search system 112 accesses the search index 114 to identify resources that are relevant to the search query 116. The search system 112 identifies the resources in the form of search results 118 and returns the search results 118 to the user devices 106 in search results pages. A search result 118 is data generated by the search system 112 that identifies a resource that is responsive to a particular search query, and includes a link to the resource. An example search result 118 can include a web page title, a snippet of text or a portion of an image extracted from the web page, and the URL of the web page. Search results pages can also include one or more slots in which other content or advertisements can be presented.

When a resource 105 or search results 118 are requested by a user device 106, the advertisement management system 110 receives a request for advertisements to be provided with the resource 105 or search results 118. The request for advertisements can include characteristics of the slots that are defined for the requested resource or search results page, and can be provided to the advertisement management system 110.

For example, a reference (e.g., URL) to the resource for which the slot is defined, a size of the slot, and/or media types that are eligible for presentation in the slot can be provided to the advertisement management system 110. Similarly, keywords associated with a requested resource ("resource keywords") or a search query 116 for which search results are requested can also be provided to the advertisement management system 110 to facilitate identification of advertisements that are relevant to the resource or search query 116.

Based on data included in a given request, the advertisement management system 110 selects advertisements or other content that is eligible to be provided in response to the request (e.g., eligible advertisements). For example, eligible advertisements can include advertisements having characteristics matching the characteristics of slots and that are identified as relevant to specified resource keywords or search queries 116. In some implementations, advertisements having targeting keywords that match the resource keywords or the search query 116 are selected as eligible advertisements by the advertisement management system 110.

A targeting keyword can match a resource keyword or a search query 116 by having the same textual content ("text") as the resource keyword or search query 116. The relevance can be based, for example, on root stemming, semantic matching, and topic matching. For example, an advertisement associated with the targeting keyword "hockey" can be an eligible advertisement for an advertisement request including the resource keyword "hockey." Similarly, the advertisement can be selected as an eligible advertisement for an advertisement request including the search query "hockey."

A targeting keyword can also match a resource keyword or a search query 116 by having text that is identified as being relevant to a targeting keyword or search query 116 despite having different text than the targeting keyword. For example, an advertisement having the targeting keyword "hockey" may also be selected as an eligible advertisement for an advertisement request including a resource keyword or search query for "sports" because hockey is a type of sport, and therefore, is likely to be relevant to the term "sports."

Targeting keywords and other data associated with the distribution of advertisements can be stored in an advertising data store 119a. The advertising data store 119a is a data store that stores data representing the advertisements, such as an advertisement identifier (e.g., Ad1 . . . Adi) and feature values (FV1 . . . FVn) that are associated with each respective advertisement. The advertising data store 119a can also store associations between advertisements and advertising campaign parameters that are used to control distribution of the advertisements. For example, the advertising data store 119 can store targeting keywords, bids, and other criteria with which each respective advertisement can be selected for presentation.

Data representing conditions under which advertisements were selected for presentation to a user, and user interaction data (Id1 . . . Idn) representing actions taken by users in response to presentation of the advertisement (e.g., Ad1 . . . Adi) can be stored in a data store such as performance data store 119b.

For example, the performance data store 119b can store data specifying targeting keywords that caused presentation of the advertisement (e.g., that matched a resource keyword or search query), resource keywords and/or search queries that matched the targeting keywords, ad slots in which the advertisement appeared, characteristics (e.g., locations and sizes) of the ad slots, and any special features that might have been applied to the advertisement. Example features that can be applied to an advertisement include the advertisement being presented with an image, the advertisement being presented with (e.g., adjacent to) multiple links (e.g., hypertext links) to different landing pages for the advertiser, or the advertisement being provided with a link that, in response to selection of the link, causes the advertisement to expand and revealing additional information associated with the advertisement (e.g., revealing a map, presenting a video clip, or providing product purchasing information).

The performance data store 119b can also store user interaction data specifying user interactions with presented advertisements (or other content items). For example, when an advertisement is presented to the user, data can be stored in the performance data store 119b representing the advertisement impression.

When a user selects (i.e., clicks) a presented advertisement, selection data is stored in the performance data store 119b representing the user selection of the advertisement. In some implementations, the selection data is stored in response to a request for a web page that is linked to by the advertisement. For example, the user selection of the advertisement can initiate a request for presentation of a web page that is provided by (or for) the advertiser. The request can include data identifying the particular cookie for the user or user device, and this data can be stored in the performance data store 119b. Likewise, data indicating that an advertisement was not selected when it was presented can also be stored in the performance data store 119b.

In some implementations, the advertisement management system 110 selects the advertisements that are provided for presentation in advertisement slots of a resource or search results page based on results of an auction. For example, the advertisement management system 110 can receive bids for advertisements and allocate the advertisement slots to the advertisements with the highest selection scores at the conclusion of the auction. The bids are amounts (e.g., maximum prices) that the advertisers will pay for presentation (or selection) of their advertisement with a resource or search results page. For example, a bid can specify an amount that an advertiser will to pay for each 1000 impressions (i.e., presentations) of the advertisement, referred to as a CPM bid. Alternatively, the bid can specify an amount that the advertiser is willing to pay for user selection (i.e., a click-through) of the advertisement or a "conversion" (e.g., when a user performs a particular action related to an advertisement provided with a resource or search results page) following selection of the advertisement.

The auction winners are determined based on the selection scores. In some implementations, a selection score is a value based, in part, on a bid and from which advertisements are selected for presentation. Each selection score can represent a bid value, or a product (or another function) of the bid value and one or more factors. In some implementations, the selection score is a product of the bid specified by the advertiser and an estimated click-through likelihood (eCTL) associated with the advertisement, which can also be referred to as an estimated click-through rate.

For example, assume that advertiser A selects a $1.00 cost per click bid ("CPC" bid) and advertiser A's advertisement is associated with an eCTL of 0.5, while advertiser B selects a $0.80 CPC bid and advertiser B's advertisement is associated with an eCTL of 0.9. In this example, Advertiser A will have a selection score of 0.5, while advertiser B will have a selection score of 0.72. Thus, advertiser B will be the auction winner in this example, even though advertiser A submitted the higher CPC bid.

When the selection score is defined to be a product of a bid and an eCTL that are associated with an advertisement, the advertisement that is associated with a higher eCTL will be selected for presentation ahead of the advertisement that is associated with a lower eCTL, assuming that the two advertisements are associated with a same bid. Similarly, if two advertisements have the same eCTL, the advertisement that is associated with a higher bid will be selected for presentation over the advertisement that is associated with the lower bid.

An eCTL is a value that specifies a likelihood (e.g., a probability) that an advertisement (or another content item) is selected by a user in response to a particular presentation of the advertisement (or other content item). For example, an eCTL of 0.30 for a particular advertisement can specify that there is a 30% likelihood that the particular advertisement will be selected by a user if presented.

In some implementations, the advertisement management system 110 provides advertisement identifiers specifying the eligible advertisements to a data processing apparatus that computes eCTL values for the eligible advertisements. Using the advertisement identifiers, the data processing apparatus retrieves feature values for each of the eligible advertisements (e.g., from the advertising data store 119a), computes the eCTL for each advertisement using the feature values and an outcome estimation model, and provides the eCTL values to the advertisement management system 110. In some implementations, the advertisement management system 110 inputs the feature values of the eligible advertisements into the outcome estimation model and receives, as output, an eCTL for each of the advertisements.

The environment 100 includes a profiling apparatus 120 that facilitates obtaining performance profiles for resources 105. In some implementations, the profiling apparatus 120 is configured to associate a performance profile of a resource 105 to a representation of the resource 105. A representation of a resource is discussed in greater detail below in association with FIG. 2A-B. In some implementations, the profiling apparatus 120 stores the performance profile, a representation of the resource and the association between the performance profile and representation of the resource 105 in model data 119c. In some implementations, resource 105 is a webpage and the performance profile for the webpage can be used to estimate click-through-rates for advertisements eligible for presentation.

Figure 2A:
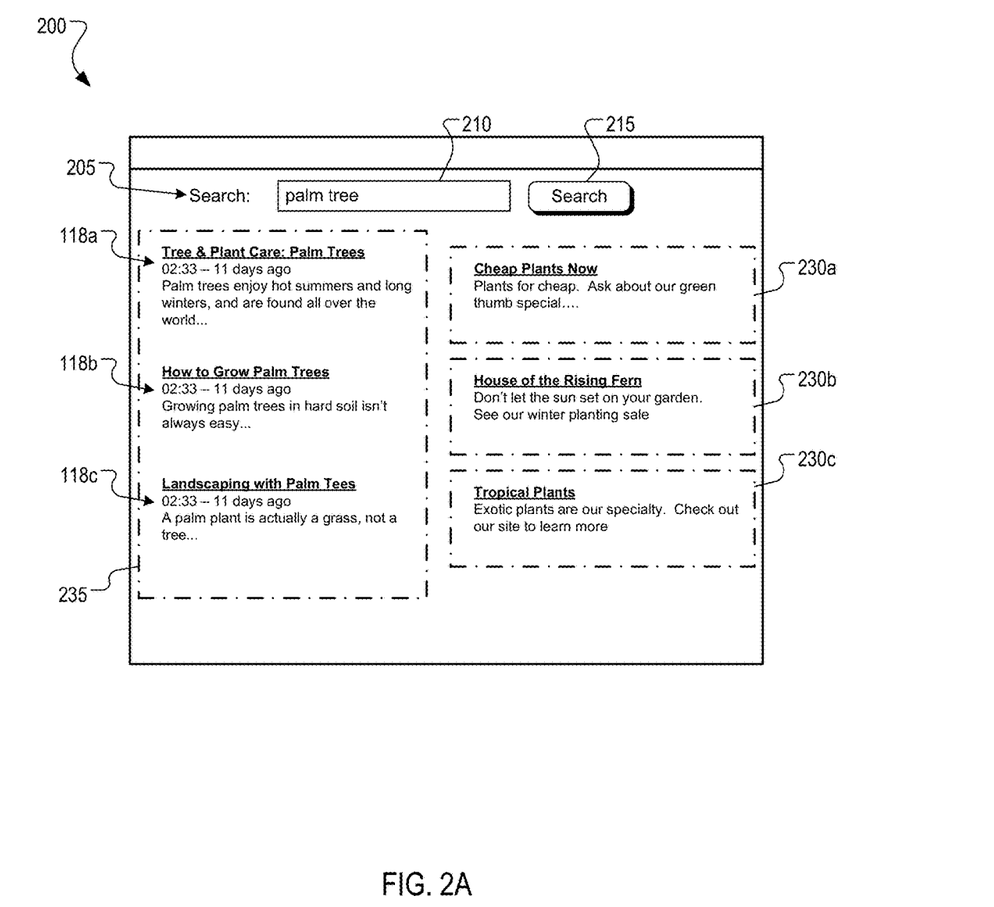
FIG. 2A is an example search results page.

FIG. 2a is an example search results page 200. The example search results page 200 is the resource 105 and was obtained in response to a search using the query, "palm tree."

The example search results page 200 includes a title 205, a search text slot 210, a search button 215, a search results container 235 and advertisement slots 230a-230c. The search results container 235 contains the search results 118 of a search performed on this resource. In this example, the search results container 235 contains the search results 118a-118c from a search performed with the search query "palm tree."

As explained previously, a resource 105 can have positional effects upon the performance of a content item presented with the resource 105. A performance profile for a resource 105 can be derived from the historical performance of content items presented with the resource 105. In some implementations, statistical measures of historical performance for content items presented with resources 105 are used to derive performance profiles for resources 105. In some other implementations, machine learning based upon the historical performance of the content items presented with resources 105 is used to derive performance profiles for resources 105. In some implementations, a performance profile for a resource 105 can be based on the performance profile of another resource 105. For example, the search results page 200 can have positional effects upon the performance of an advertisement presented with the search results page 200. A performance profile for the search results page 200 could be derived from the historical performance of advertisements presented with the search results page 200.

In some implementations, performance profiles can be represented as vectors. In this example, the performance profile would be a vector with a first value for the performance effect upon an advertisement for a given advertisement slot 230a, a second value for the performance effect for advertisement slot 230b, and a third value for the performance effect for advertisement slot 230c. In some implementations, the performance profile is a vector of values that represent normalized measures of advertisement performance for each available advertisement slot for a given resource. The performance measures can be normalized as against the performance effect of a chosen reference advertisement slot 230. In some implementations, normalization can be performed by dividing the performance measure for an advertisement slot by the performance measure for the reference advertisement slot. In some implementations, performance factors can be used to normalize performance measures for individual advertisements. For example, the normalized performance measure of an advertisement presented in advertisement slot 230a can be obtained by dividing the performance measure of the advertisement in advertisement slot 230a by the performance factor for slot 230a.

A resource 105 can be represented as a document object model (DOM) and the resource's performance profile can be associated with its DOM. In some implementations, a DOM is a cross-platform and language-independent convention for representing and interacting with objects in, for example, HTML, XHTML and XML resources. A DOM can be composed of nodes and leaf nodes with the leaf nodes being terminal nodes. For example, a DOM can be a depiction of a resource's structure along with leaf nodes specifying the resource's content. A DOM can also contain additional information about a resource. For example, a DOM can also depict the colors, fonts, styles, etc. of a resource.

Figure 2B:
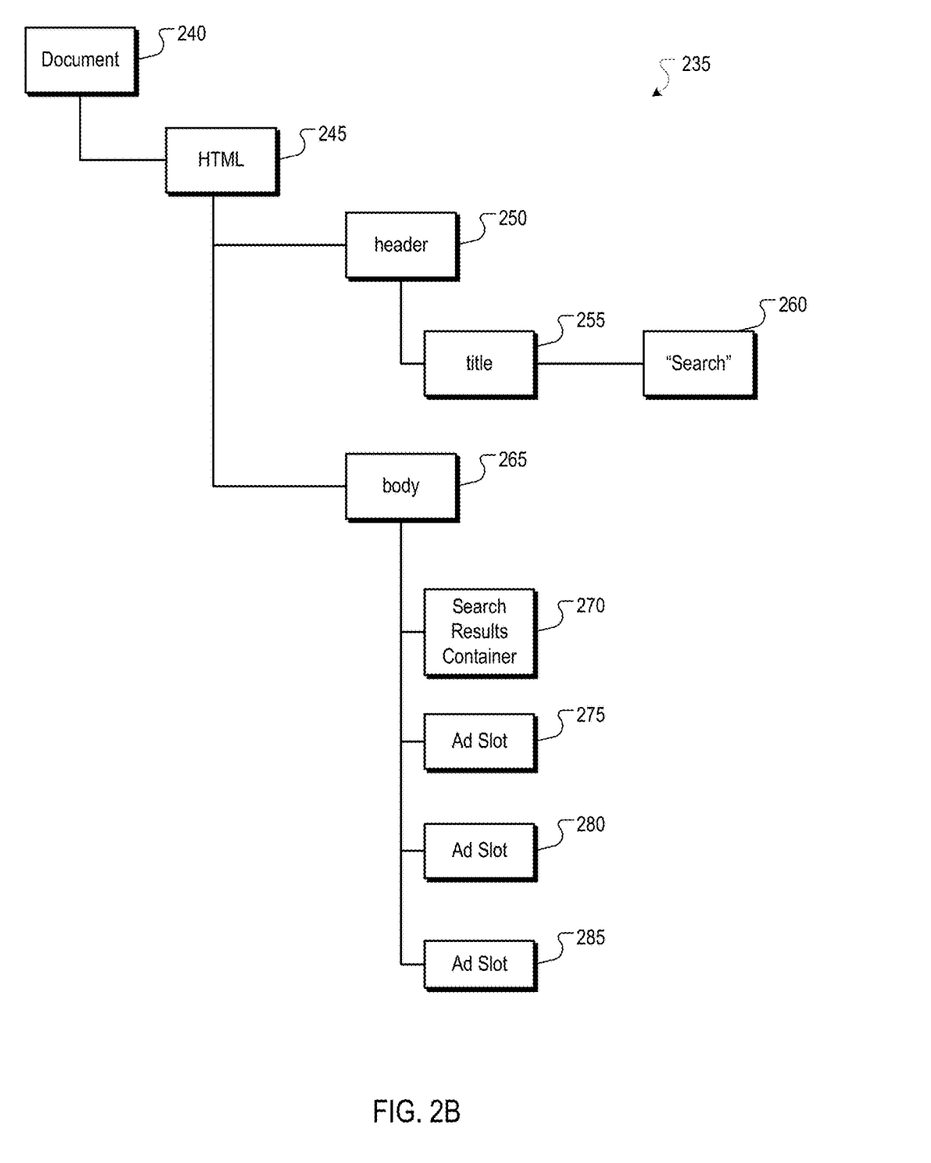
FIG. 2B is a representation of an example DOM corresponding to the example search results page.

FIG. 2b is a representation of an example DOM 235 corresponding to the example search results page 200. The DOM 235 has the top node document 240. The DOM 235 has an HTML node 245 indicating that the search results page 200 is composed of HTML. In this example, the DOM 235 includes a header node 250 and a body node 265 indicating that the search results page 200 has a header section and a body section. The header section includes a title with a value of "Search" as indicated by the title node 255 and the node 260. The body of the search results page 200 includes a search results container 235 and the advertisement slots 230a-230c as indicated by the DOM's search results container node 270 and the three advertisement slot nodes 275, 280 and 285.

Resources 105 are not static and can change. A change in a resource 105 is reflected in a change in the resource's DOM. For example, the title of search results page 200 could be changed to "Query" and the page could be changed to include another advertisement slot. In this case, node 260 would have its value changed to "Query" and the DOM 235 would include an additional advertisement slot node.

A DOM for a resource 105 can be obtained by analyzing the resource 105. For example, the DOM 235 can be obtained by analyzing the search results page 200. A DOM can be constructed such that the DOM does not represent the entirety of a resource 105 for which it is constructed. In some implementations, a DOM can be constructed such that it represents elements that have been identified as affecting the relative performance of content items presented with the resource 105. Identification of elements affecting the relative performance of content items can be performed through, for example, statistical analysis of historical data, machine learning, or human intuition. For example, the DOM 235 does not include nodes representing the search results 118a, 118b or 118c or the advertisements.

A DOM from a resource 105 can be compared to a DOM from a different resource 105 to determine the similarity between the two resources 105. Similarly, a DOM for a current version of a resource 105 can be compared to a DOM for a past version of a resource 105 to determine the similarity between the current version and past version of the resource 105. In some implementations, the comparison between two DOMs can be performed by a node-to-node comparison.

In some implementations, DOMs are associated with a value derived from a fingerprint analysis. The comparison between two DOMs can be performed by comparing the respective fingerprint values. A similarity measure can be computed based on the difference between the fingerprint values. A match between two resources 105 can be defined such that two resources are considered to differ where the similarity measure is less than a threshold.

A version ID can be associated with a DOM. The version ID can be incremented each time a resource 105 changes (e.g., sufficiently) such that its DOM no longer matches the next most recent DOM for the resource 105. The performance profile for a resource 105 can also be associated with the DOM of the resource 105. The version ID, the performance profile, and the DOM for a resource 105 can be stored into a data store 119.

Figure 3:
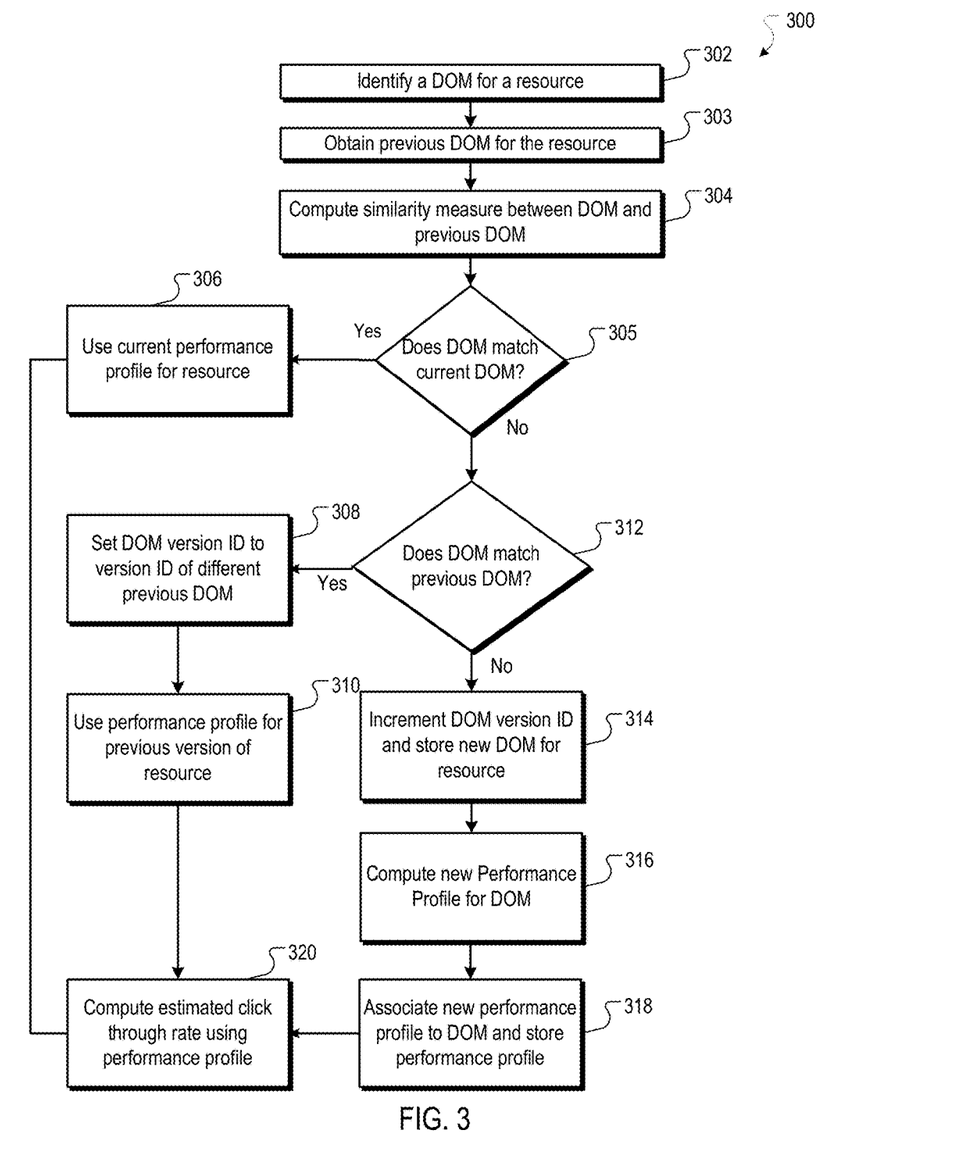
FIG. 3 is a flow chart of an example process for obtaining a performance profile for a resource.

FIG. 3 is a flow chart of an example process 300 for obtaining a performance profile for a resource 105. A resource 105 is analyzed to obtain an initial DOM for the resource 105 (302). In some implementations, the initial DOM is obtained through the analysis of a search results page. For example, a search query can be provided to a search site. A search results page can be received in response to providing the search query to the search site. The initial DOM for the resource 105 can be determined based upon the structure of the search results page. For example, a query such as "palm trees" or "flowers" can be provided to a webpage implementing a search. A search results page can be identified in response to the search. The search results page can then in turn be analyzed to construct an initial DOM for the resource 105.

A previous DOM already associated with performance factors can also be obtained for the resource 105 (303). The performance factors associated with this DOM represent the current performance profile for the resource 105. In some implementations, the performance factors represent the normalized values of a performance profile for the resource 105. Additionally, each performance factor is associated with a content presentation position on the resource 105 previously identified from the DOM for the resource 105. In some implementations, the performance factors respectively specify a normalized click-through-rate for each respective content item presentation position that has been defined for the resource 105. For example, the DOM already associated with the performance factors can be the DOM associated with the current performance profile. Some implementations store the DOM associated with the current performance profile in the data storage 119.

A similarity measure between the two DOMs for the resource 105 is computed (304). In some implementations, a value based on the structure of the initial DOM is determined. A value based on the structure of the DOM already associated with performance factors is also determined. A similarity measure between the two DOMS based on the difference between the two values can be computed. For example, a fingerprint analysis yielding a value can be performed on the initial DOM obtained from analyzing the search results page. A fingerprint analysis yielding a value can also be performed on the DOM already associated with performance factors. A similarity measure can be computed based upon the difference between the two fingerprint values.

The similarity measure is used to determine if the initial DOM matches the DOM already associated with the performance factors (305). The DOM already associated with the performance factors is referred to as the current DOM. The similarity measure can be compared against a similarity threshold to determine if the two DOMs match. If the two DOMs match, the current performance profile for the resource 105 is used (306). If the similarity measure does not meet a similarity threshold, a different performance profile is obtained for the resource 105.

In some implementations, the similarity threshold represents the amount of difference that is allowed before a different performance profile is required/obtained for the resource 105. Low thresholds correspond to small amounts of difference while high thresholds correspond to large amounts of difference. Low thresholds correspond to frequently detecting new versions of a resource 105 while high thresholds infrequently detect new versions of the resource 105. A too low threshold may result in detecting new versions of resources 105 so often that the performance profile for a resource 105 cannot be adequately calculated. A too high threshold may result in not detecting new versions of resources 105 resulting in continuing to use a performance profile not representative of the resource 105. In some implementations, the threshold is chosen in an effort to balance the frequency of generating new performance profiles for a changed resource 105 against the accuracy of representing the resource 105.

In some implementations, obtaining a different performance profile for the resource 105 is required after determining the initial DOM does not match a previous DOM for the resource 105). In some implementations, a similarity measure is computed for the initial DOM based upon the initial DOM and a value that is associated with a previous DOM for the resource 105. If it is determined that the similarity measure meets a similarity threshold, the initial DOM is considered to match the previous DOM (312). In this event, a DOM version ID is set to the DOM version ID associated with the previous DOM (308) and the performance profile associated with the previous DOM is selected for use as the current performance profile (310).

In some implementations, obtaining a different performance profile is performed, for example, by computing a new performance profile for the resource 105 (316). The new performance profile can be computed based on the performance of content items that are presented with the resource 105. As previously stated, some implementations utilize statistical measures of historical performances of content items presented with a resource 105 to derive performance profiles for the resource 105. In some implementations, machine learning based upon the historical performance of content items presented with the resource 105 are used to derive performance profiles for resource 105.

In some implementations, computing a new performance profile for a resource includes incrementing a DOM version ID. The new performance profile and the DOM version ID are associated with the initial DOM and can be stored in the data store 119. In some other implementations, the performance factors are indexed to the presentation position on the resource 105 for which the performance factor was computed. The performance factors can then be stored in the advertising data store 119.

In some implementations, the resource 105 constitutes a webpage and the content items are advertisements. In some implementations, the performance profile represents a set of click-through-rate normalization factors. The performance profile can be used to compute estimated click-through-rates of advertisements that are eligible to be presented with the webpage (320).

The description above discusses the technology in terms of using a search results page 200 for the resource 105. However, the technology is applicable to any webpage that includes advertisements. For example, a non-search results page resource 105 can be periodically fetched and a DOM for the resource 105 can be obtained and analyzed, as described above.

In some implementations, the periodicity, at which webpages can be fetched, can be a static value. For example, the periodicity can be a default value or a value set by the publisher of the resource 105. In some implementations, the periodicity, at which webpages can be fetched, can be statistically estimated or obtained through machine learning based upon an observed historical rate of change. In some implementations, the periodicity is based upon web traffic rates associated with the resource 105. For example, a web traffic spike associated with a resource 105 can indicate that the resource 105 has changed and requires its performance profile to be re-evaluated.

Figure 4:
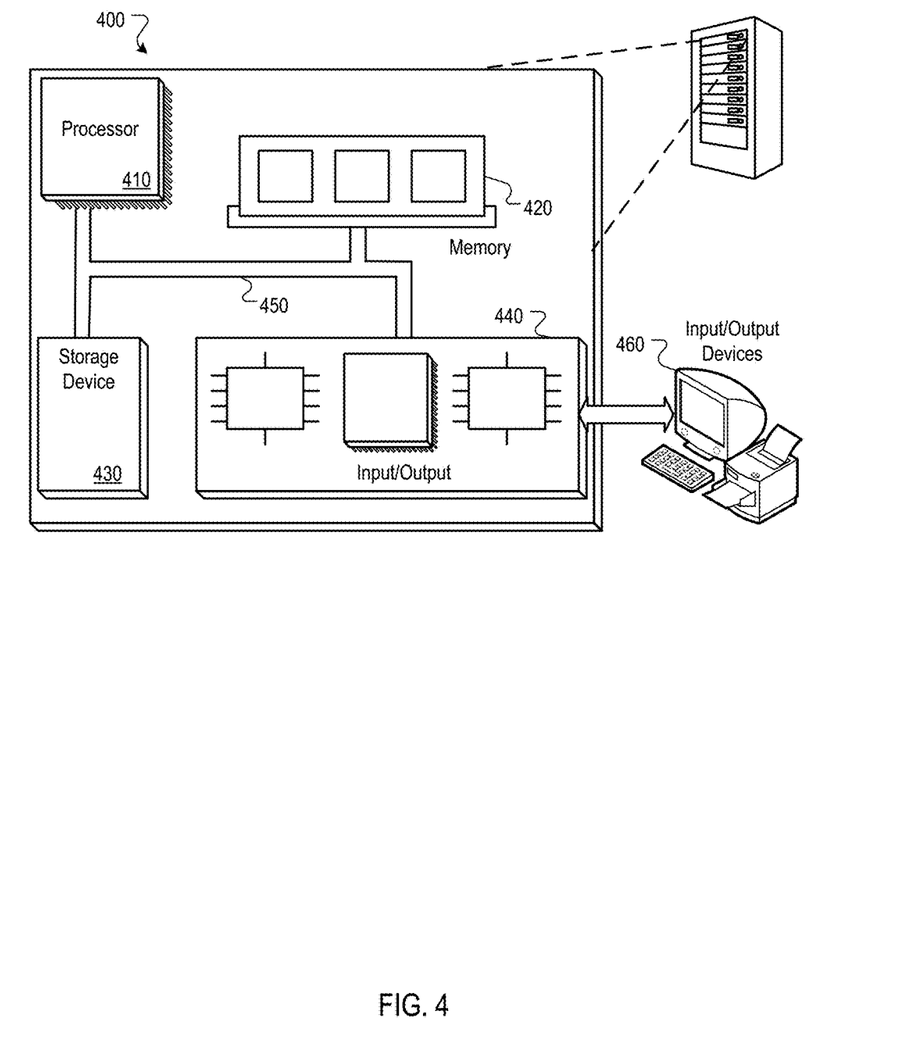
FIG. 4 is block diagram of an example computer system that can be used for obtaining and evaluating the performance profiles of providers, as described above.

FIG. 4 is block diagram of an example computer system 500 that can be used to train and/or utilize outcome estimation models, as described above. The system 400 includes a processor 410, a memory 420, a storage device 430, and an input/output device 440. Each of the components 410, 420, 430, and 440 can be interconnected, for example, using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 530.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 can include, for example, a hard disk device, an optical disk device, or some other large capacity storage device.

The input/output device 440 provides input/output operations for the system 400. In one implementation, the input/output device 440 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 460. Other implementations, however, can also be used, such as mobile computing devices, mobile communication devices, set-top box television client devices, etc.

Although an example processing system has been described in FIG. 4, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by a data processing apparatus, the method comprising:
    analyzing, by one or more processors, a resource provided over a network;
    obtaining, based on the analysis, a first document object model representing a structure of the resource at a first time and identifying a first set of content item presentation positions;
    computing, by the one or more processors, a first performance profile for the first document object model, the first performance profile specifying a plurality of performance factors, each of the plurality of performance factors based on a number of user interactions with a content item at a content item presentation position of the first set of content item presentation positions;
    analyzing, by the one or more processors, the resource to obtain a second document object model representing a second structure of the resource at a second time after the first time, the second document object model identifying a second set of content item presentation positions;
    computing, by the one or more processors, a similarity measure between the first document object model and the second document object model;
    determining, by the one or more processors, that the similarity measure is less than a similarity threshold; and
    updating, by the one or more processors based on the determination, the first performance profile for the resource to a second performance profile for the resource.

2. The method of claim 1, wherein each performance factor specifies a normalized click-through-rate for each respective content item presentation position.

3. The method of claim 2, further comprising:
    identifying each respective content item presentation position from the first document object model for the resource.

4. The method of claim 1, wherein computing the similarity measure comprises:
    determining a first fingerprint value based on a fingerprint analysis of a structure of the first document object model;

determining a second fingerprint value based on a fingerprint analysis of a structure of the second document object model; and comparing the first fingerprint value to the second fingerprint value.

5. The method of claim 1, wherein updating the first performance profile for the resource to the second performance profile is based on performance of content items presented with the resource since the second time.

6. The method of claim 5, further comprising storing the second performance profile with a reference to the second document object model.

7. The method of claim 6, wherein storing the second performance profile comprises indexing each respective performance factor according to a content item presentation position for which the performance factor was computed.

8. The method of claim 1, further comprising:

obtaining a third document object model representing a third structure of the resource at a third time after the second time;

computing a second similarity measure between the second document object model and the third document object model;

determining that the second similarity measure exceeds the similarity threshold; and selecting the second performance profile for the resource.

9. The method of claim 1, wherein the resource is a web page, the performance profile comprises a set of click-through-rate normalization factors, and the content items are advertisements.

10. The method of claim 9, further comprising:

computing, using the performance profile, an estimated click-through-rate for an advertisement that is eligible to be presented with the web page.

11. A non-transitory computer storage medium encoded with a computer program, the program comprising instructions that when executed by data processing apparatus cause the data processing apparatus to perform operations comprising:

analyzing, by one or more processors, resource provided over a network;

obtaining, based on the analysis, a first document object model representing a structure of the resource at a first time and identifying a first set of content item presentation positions;

computing, by the one or more processors, a first performance profile for the first document object model, the first performance profile specifying a plurality of performance factors, each of the plurality of performance factors based on a number of user interactions with a content item at a content item presentation position of the first set of content item presentation positions;

analyzing, by the one or more processors, the resource to obtain a second document object model representing a second structure of the resource at a second time after the first time, the second document object model identifying a second set of content item presentation positions;

computing, by the one or more processors, a similarity measure between the first document object model and the second document object model;

determining, by the one or more processors, that the similarity measure is less than a similarity threshold; and updating, by the one or more processors based on the determination, the first performance profile for the resource to a second performance profile for the resource.

12. The computer storage medium of claim 11, wherein each performance factor specifies a normalized click-through-rate for each respective content item presentation position.

13. A system comprising:

a data processing apparatus including one or more processors to:

analyze, by one or more processors, resource provided over a network;

obtain, based on the analysis, a first document object model representing a structure of the resource at a first time and identifying a first set of content item presentation positions;

compute, by the one or more processors, a first performance profile for the first document object model, the first performance profile specifying a plurality of performance factors, each of the plurality of performance factors based on a number of user interactions with a content item at a content item presentation position of the first set of content item presentation positions;

analyze, by the one or more processors, the resource to obtain a second document object model representing a second structure of the resource at a second time after the first time, the second document object model identifying a second set of content item presentation positions;

compute, by the one or more processors, a similarity measure between the first document object model and the second document object model;

determine, by the one or more processors, that the similarity measure is less than a similarity threshold; and update, by the one or more processors based on the determination, the first performance profile for the resource to a second performance profile for the resource.

14. The system of claim 13, wherein each performance factor specifies a normalized click-through-rate for each respective content item presentation position.

15. The system of claim 13, comprising the data processing apparatus configured to:

determine a first fingerprint value based on a fingerprint analysis of the first document object model;

determine a second fingerprint value based on a fingerprint analysis of the second document object model; and compute the similarity measure by comparing the first fingerprint value to the second fingerprint value.

16. The system of claim 13, comprising the data processing apparatus configured to:

compute the second performance profile based on performance of content items presented with the resource since the second time.

17. The system of claim 16, comprising the data processing apparatus configured to:

store the second performance profile with a reference to the second document object model.

18. The system of claim 13, comprising the data processing apparatus configured to:

obtain a third document object model representing a third structure of the resource at a third time after the second time;

compute a second similarity measure between the second
   document object model and the third document object
   model;
determine that the second similarity measure exceeds the
   similarity threshold; and
select the second performance profile for the resource.

* * * * *